(12) United States Patent
Liu et al.

(10) Patent No.: US 12,717,408 B2
(45) Date of Patent: Aug. 25, 2026

(54) METHOD AND APPARATUS FOR PREDICTING USER INTERACTIVE INTENTION, AND STORAGE MEDIUM

(71) Applicant: Beijing Zitiao Network Technology Co., Ltd., Beijing (CN)

(72) Inventors: Mengqian Liu, Beijing (CN); Shuo Liu, Beijing (CN); Chi Fang, Beijing (CN); Jia Guo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/285,624

(22) Filed: Jul. 30, 2025

(65) Prior Publication Data

US 2026/0037064 A1 Feb. 5, 2026

(30) Foreign Application Priority Data

Jul. 30, 2024 (CN) ......................... 202411035854.3

(51) Int. Cl.

| | |
|---|---|
| ***G06F 3/01*** | (2006.01) |
| ***G06T 7/246*** | (2017.01) |
| ***G06T 7/73*** | (2017.01) |

(52) U.S. Cl.

CPC .............. *G06F 3/013* (2013.01); *G06F 3/017* (2013.01); *G06T 7/246* (2017.01); *G06T 7/73* (2017.01)

(58) Field of Classification Search

CPC .......... G06F 3/013; G06F 3/017; G06F 3/011; G06T 7/246; G06T 7/73; G06T 19/006

See application file for complete search history.

(56) References Cited

U.S. PATENT DOCUMENTS

| | | | | |
|---|---|---|---|---|
| 2013/0335303 | A1* | 12/2013 | Maciocci | G02B 27/017 345/8 |
| 2017/0336882 | A1* | 11/2017 | Tome | G06F 3/03547 |
| 2018/0321737 | A1* | 11/2018 | Pahud | G06F 3/0304 |
| 2019/0391710 | A1* | 12/2019 | Shen | G06F 3/04883 |
| 2022/0121344 | A1* | 4/2022 | Pastrana Vicente | G06F 3/013 |
| 2025/0377760 | A1* | 12/2025 | Mckenzie | G06F 3/013 |

FOREIGN PATENT DOCUMENTS

| | | |
|---|---|---|
| CN | 111949131 A | 11/2020 |
| CN | 116830064 A | 9/2023 |

* cited by examiner

*Primary Examiner* — Premal R Patel

(57) ABSTRACT

A method and an apparatus for predicting user interactive intention, and a storage medium are provided. The method includes: acquiring position information of a visual indicator identifier, the visual indicator identifier being configured to mark a manipulation position of an user in a preset space; determining a relative position relationship between the visual indicator identifier and a predicted hot region of an interaction object according to the position information of the visual indicator identifier; determining a first motion feature of the visual indicator identifier in the predicted hot region, when it is determined that the visual indicator identifier is located in the predicted hot region according to the relative position relationship; and determining the interaction object as a target interaction object with which the user has interactive intention when the first motion feature of the visual indicator identifier matches with an intra-hot-region motion feature.

20 Claims, 7 Drawing Sheets

Acquiring position information of a visual indicator identifier; the visual indicator identifier is configured to mark a manipulation position of a user in a preset space. — S101

Determining a relative position relationship between the visual indicator identifier and a predicted hot region of an interaction object according to the position information of the visual indicator identifier. — S102

Determining a first motion feature of the visual indicator identifier in the predicted hot region when it is determined that the visual indicator identifier is located in the predicted hot region according to the relative position relationship. — S103

Determining the interaction object corresponding to the predicted hot region as a target interaction object with which the user has interactive intention when the first motion feature of the visual indicator identifier matches with an intra-hot-region motion feature corresponding to the predicted hot region. — S104

Memory 902
Program
Processor 903
Communication bus 901

METHOD AND APPARATUS FOR PREDICTING USER INTERACTIVE INTENTION, AND STORAGE MEDIUM

CROSS-REFERENCE TO RELATED APPLICATION

The present application claims the priority of the Chinese patent application No. 202411035854.3 filed on Jul. 30, 2024, the entire content of which is hereby incorporated by reference as a part of the present application.

TECHNICAL FIELD

The present disclosure belongs to the technical field of extended reality, and in particular relates to a method and an apparatus for predicting user interactive intention, and a storage medium.

BACKGROUND

Virtual reality (VR), augmented reality (AR) and mixed reality (MR) are collectively referred to as extended reality (XR).

In the XR scene, a user usually uses a gesture control mode or an eye movement control mode or a controller to interact with the virtual world. In the related art, in the above control modes, due to the limitation of an input apparatus and the instability of selection accuracy, the user may need to perform a plurality of selection operations to select the desired target. However, this may waste time and energy of the user, and may even lead to fatigue and dissatisfaction of the user, resulting in poor user interaction experience.

SUMMARY

An embodiment of the present disclosure provides a method and an apparatus for predicting user interactive intention, and a storage medium, so as to solve the technical problem of poor user interaction experience in the related art.

In a first aspect, an embodiment of the present disclosure provides a method for predicting user interactive intention, the method comprises:

- acquiring position information of a visual indicator identifier, the visual indicator identifier being configured to mark a manipulation position of a user in a preset space;
- determining a relative position relationship between the visual indicator identifier and a predicted hot region of an interaction object according to the position information of the visual indicator identifier;
- determining a first motion feature of the visual indicator identifier in the predicted hot region, when it is determined that the visual indicator identifier is located in the predicted hot region according to the relative position relationship; and
- determining the interaction object corresponding to the predicted hot region as a target interaction object with which the user has interactive intention, when the first motion feature of the visual indicator identifier matches with an intra-hot-region motion feature corresponding to the predicted hot region.

In some embodiments, the predicted hot region comprises a first sub-region, and the first sub-region is located at a periphery of a sensing region of the interaction object.

In some embodiments, the predicted hot region further comprises a second sub-region, and the second sub-region is connected to an outer side of the first sub-region.

In some embodiments, the second sub-region extends along a direction away from the sensing region of the interaction object.

In some embodiments, the second sub-region extends toward at least one edge of the preset space; or,

- the second sub-region extends in a direction toward a center of the preset space.

In some embodiments, the second sub-region extends toward two opposite edges of the preset space.

In some embodiments, the second sub-region extends toward two adjacent edges of the preset space.

In some embodiments, when a distance between sensing regions of two interaction objects is less than or equal to a first distance threshold, the predicted hot regions of the two interaction objects are partially overlapped with each other.

In some embodiments, the determining the interaction object as the target interaction object with which the user has interactive intention further comprises:

- determining scores of the visual indicator identifier corresponding to the predicted hot regions of the two interaction objects, respectively, when the visual indicator identifier is located in an overlapping region of two predicted hot regions;
- taking the interaction object corresponding to the highest score as the target interaction object with which the user has interactive intention.

In some embodiments, the determining the interaction object corresponding to the predicted hot region as a target interaction object with which the user has interactive intention, when the first motion feature of the visual indicator identifier matches with an intra-hot-region motion feature corresponding to the predicted hot region comprises:

- determining the interaction object corresponding to the predicted hot region as the target interaction object with which the user has interactive intention, when a speed curve of the visual indicator identifier conforms to a speed condition of a first-order feature region in the predicted hot region and the speed curve of the visual indicator identifier conforms to a speed condition of a second-order feature region in the predicted hot region; and
- the second-order feature region is located between the first-order feature region and the sensing region of the interaction object.

In some embodiments, the determining the interaction object corresponding to the predicted hot region as a target interaction object with which the user has interactive intention, when the first motion feature of the visual indicator identifier matches with an intra-hot-region motion feature corresponding to the predicted hot region comprises:

- determining the interaction object corresponding to the predicted hot region as the target interaction object with which the user has interactive intention when an acceleration curve of the visual indicator identifier conforms to an acceleration condition of the first-order feature region in the predicted hot region and the acceleration curve of the visual indicator identifier conforms to an acceleration condition of the second-order feature region in the predicted hot region; and
- the second-order feature region is located between the first-order feature region and the sensing region of the interaction object.

In some embodiments, after determining the target interaction object, the method further comprises:

displaying the target interaction object with a highlighting effect.

In some embodiments, the method further comprises:

determining a range of the predicted hot region corresponding to a control mode selected by the user and the intra-hot-region motion feature corresponding to the predicted hot region, in response to a selection operation of the control mode; and the control mode comprises a gesture control mode, an eye movement control mode, and an interactor control mode.

In some embodiments, the method further comprises:

determining a second motion feature of the visual indicator identifier, when it is determined that a distance between the visual indicator identifier and an edge of the predicted hot region is less than or equal to a second distance threshold according to the relative position relationship; and determining the interaction object corresponding to the predicted hot region as the target interaction object with which the user has interactive intention, when the second motion feature of the visual indicator identifier matches with a motion feature of a hot region edge of the predicted hot region.

In a second aspect, an embodiment of the present disclosure provides a device of predicting user interactive intention, the device comprises:

an acquisition unit, being configured to acquire position information of a visual indicator identifier, and the visual indicator identifier being configured to mark a manipulation position of an user in a preset space;

a first determining unit, being configured to determine a relative position relationship between the visual indicator identifier and a predicted hot region of an interaction object according to the position information of the visual indicator identifier;

a second determining unit, being configured to determine a first motion feature of the visual indicator identifier in the predicted hot region, when it is determined that the visual indicator identifier is located in the predicted hot region according to the relative position relationship; and a third determining unit, being configured to determine the interaction object corresponding to the predicted hot region as a target interaction object with which the user has interactive intention, when the first motion feature of the visual indicator identifier matches with an intra-hot-region motion feature corresponding to the predicted hot region.

In a third aspect, an embodiment of the present disclosure provides an apparatus for predicting user interactive intention, and the apparatus for predicting user interactive intention comprises a processor and a memory being configured to store executable instructions of the processor, and the processor is configured to perform the method in any of embodiments mentioned above by executing the executable instructions.

In a fourth aspect, an embodiment of the present disclosure provides a non-transitory computer-readable storage medium, the computer-readable storage medium stores a computer program, and when the computer program is executed by a processor, the method in any of embodiments mentioned above is implemented.

In a fifth aspect, an embodiment of the present disclosure provides a computer program product comprising a computer program, and the computer program, when executed by a processor, implements the method in any of embodiments mentioned above.

BRIEF DESCRIPTION OF DRAWINGS

In order to more clearly explain the technical solution in embodiments of the present disclosure or the prior art, the drawings required to be used in the description of the embodiments or the prior art are briefly introduced below. It is obvious that the drawings in the description below are some embodiments of the present disclosure. Other drawings may also be obtained according to these drawings without creative labor for those skilled in the field. In the accompanying figures.

DETAILED DESCRIPTION

Figure 1:
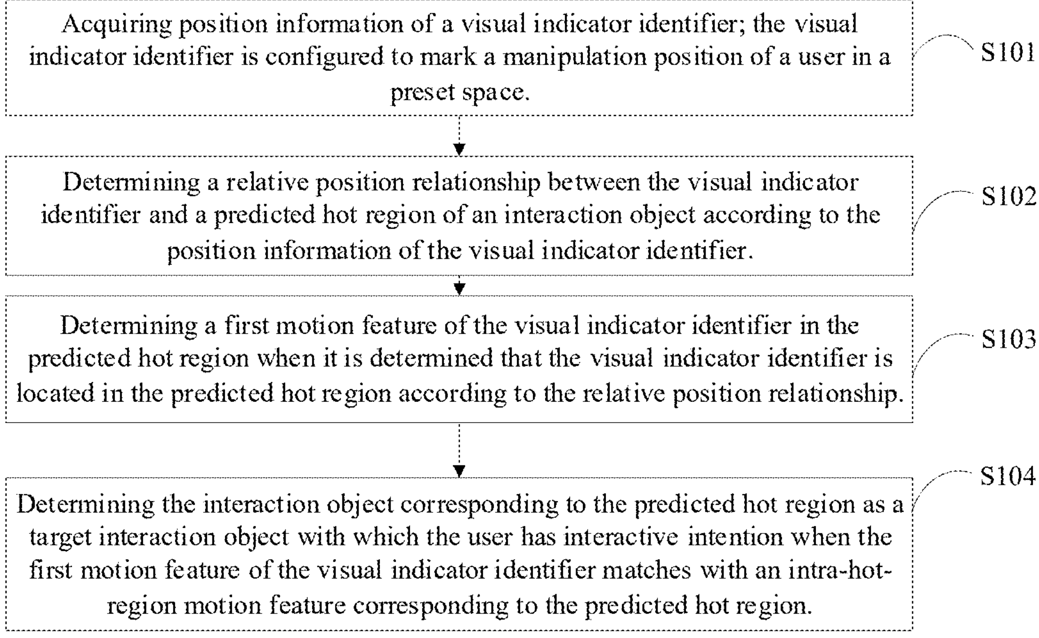
FIG. 1 is a schematic diagram of a flow chart of a method for predicting user interactive intention according to an embodiment of the present disclosure.

Embodiments of the present disclosure are described in more detail below, examples of the embodiments are shown in the drawings. The embodiments described below by reference to the drawings are illustrative and are intended to explain the present disclosure, and cannot be understood as a limitation of the present disclosure.

It should be understood that various steps recorded in method implementation modes of the present disclosure may be executed in different orders and/or executed in parallel. In addition, the method implementation modes may include additional steps and/or omit executing steps shown. The scope of the present disclosure is not limited in this aspect.

The term "including" and its variations used in the present disclosure are open-ended including, namely "including but not limited to". The term "based" is "based at least partially". The term "an embodiment" means "at least one embodiment"; the term "another embodiment" means "at least one additional embodiment"; and the term "some embodiments" means "at least some embodiments". The relevant definitions of other terms are provided in the following description.

It should be noted that the concepts such as "first" and "second" mentioned in the present disclosure are only used to distinguish different devices, modules, or units, and are not intended to limit the orders of functions executed by these devices, modules, or units or relationships of interdependence thereof.

It should be noted that the modifications of "a", "an" and "a plurality of" mentioned in the present disclosure are schematic rather than restrictive, and those skilled in the art should understand that unless otherwise explicitly stated in the context, it should be understood as "one or more".

The names of messages or information interacted between a plurality of devices in embodiments of the present disclosure are only for descriptive purposes and are not intended to limit the scope of these messages or information.

The embodiment of the present disclosure may be applied to various application scenes such as Extended Reality (XR), Virtual Reality (VR), Augmented Reality (AR), and Mixed Reality (MR).

First of all, some nouns or terms appearing in the process of describing the embodiment of the present disclosure are explained as follows.

Extended Reality (XR) is a concept which comprises Virtual Reality (VR), Augmented Reality (AR) and Mixed Reality (MR), and represents a technology by which an environment in which the virtual world is connected with the real world are created and a user can interact with the environment in real time.

Virtual Reality (VR) is a technology of creating and experiencing the virtual world. For the VR, a virtual environment is generated by using calculation. The VR is multi-source information (the virtual reality mentioned in the present disclosure comprises at least visual perception, and in addition, further comprises auditory perception, tactile perception, motion perception, and even taste perception, smell perception, etc.), so as to realize the fusion and interactive simulation of three-dimensional dynamic scenes and entity behaviors of the virtual environment. A user may be immersed in the simulated virtual reality environment, so that the VR is applied in various virtual environments such as maps, games, videos, education, medical care, simulation, collaborative training, sales, assistance in manufacturing, maintenance and repair.

Augmented reality (AR) is a technology that calculates the camera attitude parameters of the camera in the real world (or the three-dimensional world or the actual world) in real time during the process that the camera captures images, and adds virtual elements to the images captured by the camera according to the camera attitude parameters. Virtual elements include, but are not limited to, an image, a video and a three-dimensional model. The goal of the AR technology is to connect the virtual world with the real world on the screen for interaction.

Mixed Reality (MR) is a simulated setting that integrates the sensory input created by the computer (for example, a virtual object) with the sensory input from the physical setting or its representation. In some MR scenes, the sensory input created by the computer can adapt to the change of the sensory input from the physical setting. In addition, some electronic systems for presenting MR scene can monitor the orientation and/or position with respect to the physical setting, so that the virtual object can interact with the real object (i.e., a physical element from the physical scene or its representation). For example, the system may monitor the movement so that a virtual plant appears stationary with respect to a physical building.

An Augmented Virtuality (AV) setting refers to a simulated setting in which a setting created by a computer or a virtual setting incorporates at least one sensory input from a physical setting. One or more sensory inputs from the physical setting may be a representation of at least one feature of the physical setting. For example, a virtual object may be rendered in the color of a physical element captured by one or more imaging sensors. As another example, a virtual object may exhibit features consistent with actual weather conditions in the physical setting, as identified via weather-related imaging sensors and/or online weather data. In another example, an augmented reality forest may have virtual trees and structures, but animals may have features accurately reproduced from images taken of physical animals.

In the related art, due to the limitation of an input device and the instability of selected accuracy, the user usually needs to perform a plurality of selecting operations to select the desired target, thus wasting time and energy of the user, even leading to fatigue and dissatisfaction of the user, and further resulting in poor user interaction experience.

In order to overcome the above problems, the present embodiment provides a method for predicting user interactive intention. Based on the real-time captured motion data of the visual indicator identifier corresponding to a gesture or an eye movement of an user or a controller or the like, the next operation intention of the user is predicted in combination with the feature of the predicted hot region of the interaction object, thus helping the user to conveniently and quickly perform the selecting operation, saving the time and energy of the user, reducing fatigue and dissatisfaction of the user, and further improving user interaction experience.

The technical solution of the present disclosure and how the technical solution of the present disclosure solves the above technical problems will be described in detail with reference to specific embodiments hereinafter. The following specific embodiments may be combined with each other, and the same or similar concepts or processes may not be described in detail in some embodiments. The embodiment of the present disclosure will be described with reference to the accompanying drawings hereinafter.

FIG. 1 is a schematic diagram of a flow chart of a method for predicting user interactive intention according to an embodiment of the present disclosure. With reference to FIG. 1, the method for predicting user interactive intention in the embodiment comprises the following steps:

- S101, acquiring position information of a visual indicator identifier; the visual indicator identifier is configured to mark a manipulation position of a user in a preset space.

S102, determining a relative position relationship between the visual indicator identifier and a predicted hot region of an interaction object according to the position information of the visual indicator identifier.

S103, determining a first motion feature of the visual indicator identifier in the predicted hot region when it is determined that the visual indicator identifier is located in the predicted hot region according to the relative position relationship.

S104, determining the interaction object corresponding to the predicted hot region as a target interaction object with which the user has interactive intention when the first motion feature of the visual indicator identifier matches with an intra-hot-region motion feature corresponding to the predicted hot region.

The execution subject of the embodiment may be a terminal. The terminal may be used to display a graphical user interface. The terminal is used to interact with a user through the graphical user interface, for example, downloading and installing the corresponding client through the terminal and running the client, for example, calling the corresponding applet and running the applet, for example, presenting the corresponding graphical user interface by logging in to a website, etc.

In Step S101, the visual indicator identifier in the embodiment is use to indicate a position where the current focus of the user is mapped into the preset space. At least one interaction object (also referred to as operable object) that can interact with the user is located in the preset space. The preset space may be an interaction region in the graphical user interface of the terminal. Alternatively, the preset space may be an interaction space in a three-dimensional space. The preset space may be circular or rectangular, spherical or prismatic. The size and the shape of the preset space may be set according to actual needs.

Figure 2A:
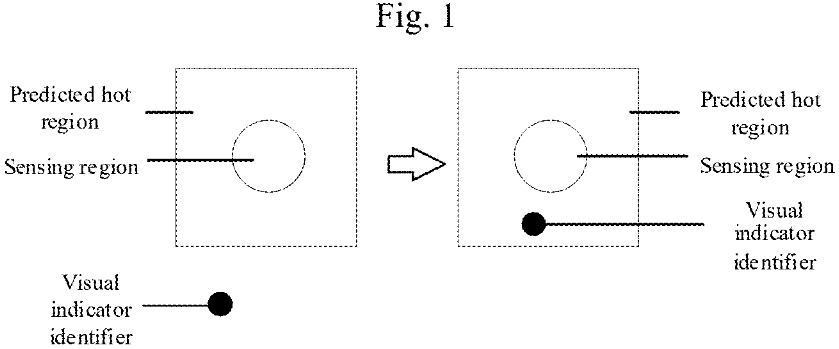
FIG. 2*a* and FIG. 2*b* are schematic diagrams of a motion scene of a visual indicator identifier according to an embodiment of the present disclosure.
Figure 2B:
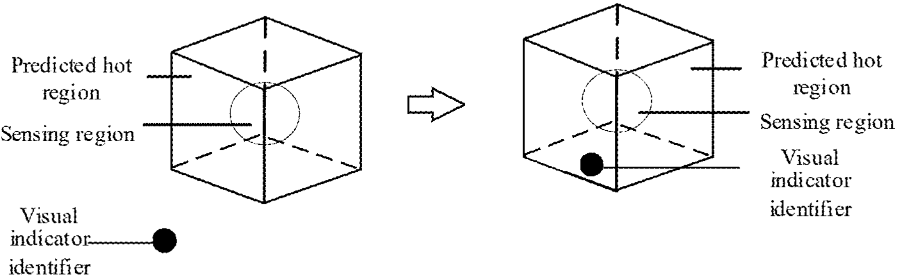

As shown in FIG. 2*a* and FIG. 2*b*, the visual indicator identifier may move in a preset space. The shape of the visual indicator identifier may be a circle dot, an arrow, a cross, a finger, etc., which may be set according to actual needs.

The position information of the visual indicator identifier may be the position information of the visual indicator identifier in the preset space, which is used to reflect the position change or the movement condition of the visual indicator identifier in the preset space. For example, taking a point in the preset space as the origin and constructing a coordinate system, the position information of the visual indicator identifier may comprise the coordinates of the visual indicator identifier in the coordinate system. For another example, taking the edge of the preset space as a reference, the position information of the visual indicator identifier may comprise the distance between the visual indicator identifier and a plurality of edges of the preset space.

In Step S102, a relative position relationship between the visual indicator identifier at the current moment and a predicted hot region of the above interaction object may be determined according to the acquired position information of the visual indicator identifier at the current moment and according to the position information of the predicted hot region of the interaction object, so as to judge whether the visual indicator identifier enters the predicted hot region of the interaction object.

As shown in FIG. 2*a* and FIG. 2*b*, the predicted hot region of the interaction object (also referred to as a Prehover hot region) is located at the outer side of the sensing region of the interaction object (also referred to as a hover region), that is, the predicted hot region of the interaction object is located at a side of the sensing region away from the center. The sensing region of the interaction object refers to a region which can trigger the interaction object to implement the preset function after the visual indicator identifier enters the region. Alternatively, the predicted hot region may be located at the outer side of the sensing region and provided around the sensing region. For example, if the sensing region of the interaction object is circular, the predicted hot region may be an annular region located at the periphery of the sensing region.

Generally, when the preset space is the interaction region in the graphical user interface of the terminal, as shown in FIG. 2*a*, the predicted hot region is also the region in the two-dimensional space. In the scene, the interaction object is usually a 2D component. When the preset space is an interaction space in the three-dimensional space, as shown in FIG. 2*b*, the predicted hot region is also a space in the three-dimensional space. In the scene, the interaction object is usually a 3D component.

The position information of the predicted hot region of the interaction object comprises a position information of the outer edge of the predicted hot region. The position information of the predicted hot region of the interaction object may further comprise the position information of the inner edge of the predicted hot region. The specific shape and size of the predicted hot region may be set according to actual needs.

If the position of the interaction object in the preset space is relatively fixed, the position information of the predicted hot region of the interaction object may be acquired and stored in advance. If the position of the interaction object in the preset space is relatively movable, the position information of the predicted hot region of the interaction object may be acquired in real time. Alternatively, the position information of the predicted hot region of the interaction object may be updated every time the interaction object moves.

In a specific implementation, after acquiring the position information of the visual indicator identifier and the position information of the predicted hot region of the interaction object, it may be determined that the visual indicator identifier is located at the outer side of the predicted hot region of a nearer interaction object, and the distance between the visual indicator identifier and the outer edge of the predicted hot region of the nearer interaction object maybe determined, or it may be determined that the visual indicator identifier is partially overlapped with the outer edge of the predicted hot region of the interaction object, or it may be determined that the visual indicator identifier enters the predicted hot region of the interaction object. In the left schematic diagrams of FIG. 2*a* and FIG. 2*b*, the visual indicator identifier is located outside the predicted hot region. In the right schematic diagrams of FIG. 2*a* and FIG. 2*b*, the visual indicator identifier is located inside the predicted hot region.

In order to improve the response speed, a moving direction of the visual indicator identifier may be analyzed according to the real-time position information of the visual indicator identifier, and the distance between the visual indicator identifier and the outer edge of the predicted hot region of one or more interaction objects located in front of the moving direction of the visual indicator identifier may be determined. In this way, there is no need to analyze and determine the relative position relationship between the visual indicator identifier and the predicted hot region of other interaction objects, which can reduce the data processing amount. Of course, in other examples, the distance between the visual indicator identifier and the outer edge of the predicted hot region of one or more interaction objects around the visual indicator identifier may also be determined.

Figure 3A:
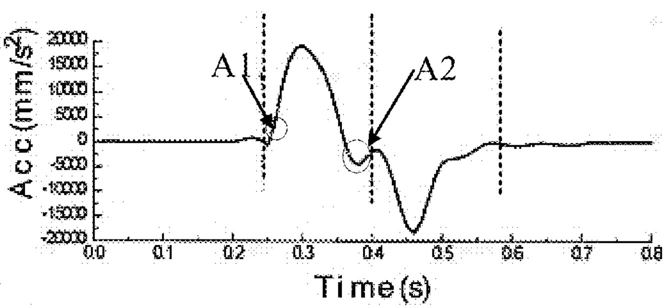
FIG. 3*a* is an acceleration curve of a visual indicator identifier according to an embodiment of the present disclosure.

In Step S103, when it is determined that the visual indicator identifier enters the predicted hot region of the interaction object, the motion data of the visual indicator identifier in the predicted hot region may be subjected to feature analysis, and the first motion feature of the visual indicator identifier in the predicted hot region may be determined. Alternatively, the first motion feature of the visual indicator identifier in the predicted hot region may comprise a speed curve and/or an acceleration curve. An acceleration curve graph of the visual indicator identifier is shown in FIG. 3*a*.

In a specific implementation, the first motion feature of the visual indicator identifier in the predicted hot region may be determined according to the position information of the visual indicator identifier at different times, that is, according to the position change of the visual indicator identifier. Alternatively, for the scene with the sensing function for collecting the speed or the acceleration, the first motion feature of the visual indicator identifier in the predicted hot region may also be determined according to the real-time collected speed or acceleration.

In Step S104, the first motion feature of the visual indicator identifier in the predicted hot region matches with an intra-hot-region motion feature corresponding to the predicted hot region where the visual indicator identifier enters. If the first motion feature matches with the intra-hot-region motion feature, it is determined that the interaction object is a target interaction object with which the user has interactive intention.

The motion data of the visual indicator identifier in the predicted hot region of the interaction object among the historical data may be analyzed to obtain the intra-hot-region motion feature of the predicted hot region of the interaction object.

In some examples, by analyzing the moving process of the visual indicator identifier in the predicted hot region, it is found that the visual indicator identifier usually moves at a variable speed in the predicted hot region, and the moving trend is to accelerate first and then decelerate. Specifically, when the visual indicator identifier is close to the sensing region of the interaction object, the visual indicator identifier accelerates to get close to the sensing region quickly. At the stage, the acceleration increases from 0 and then decreases to 0. Thereafter, because a distance between the visual indicator identifier and the sensing region is small, the visual indicator identifier needs to decelerate at this time, so as to prevent the visual indicator identifier from moving too fast and leaving the sensing region, and ensure that the visual indicator identifier accurately hovers in the sensing region of the interaction object. At the stage, the acceleration decreases from 0 and then increases to 0.

Figure 3B:
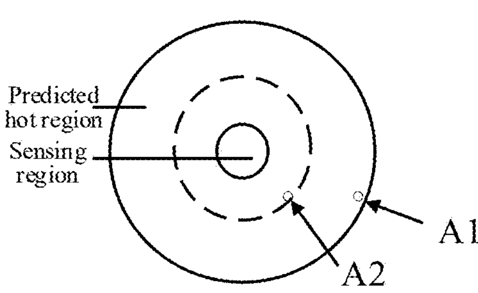
FIG. 3*b* is a schematic diagram of the position of a multi-order feature region of a predicted hot region according to an embodiment of the present disclosure.

Therefore, as shown in FIG. 3*b*, there is a multi-order feature region in the predicted hot region, in which the speed condition corresponding to the first-order feature region A1 is that the speed increases, and the acceleration condition is that the acceleration increases from 0; the speed condition corresponding to the second-order feature region A2 is that the speed decreases, and the acceleration condition is that the acceleration decreases to 0 and there is a trend of further decrease. The second-order feature region is located between the sensing region and the first-order feature region.

Alternatively, in Step S104, determining that the interaction object corresponding to the predicted hot region is a target interaction object with which the user has interactive intention when the first motion feature of the visual indicator identifier matches with an intra-hot-region motion feature corresponding to the predicted hot region comprises: determining that the interaction object corresponding to the predicted hot region is a target interaction object with which the user has interactive intention when an acceleration curve of the visual indicator identifier conforms to an acceleration condition of the first-order feature region in the predicted hot region and the acceleration curve of the visual indicator identifier conforms to an acceleration condition of the second-order feature region in the predicted hot region; wherein the second-order feature region is located between the first-order feature region and the sensing region. The acceleration condition of the first-order feature region is as follows: the acceleration is greater than or equal to 0 and gradually increases. The acceleration condition of the second-order feature region is as follows: the acceleration decreases and the acceleration is less than or equal to 0. If the acceleration curve of the visual indicator identifier does not conform to the acceleration condition of the first-order feature region or the acceleration condition of the second-order feature region, the interaction object corresponding to the predicted hot region cannot be determined as the target interaction object.

Alternatively, in Step S104, determining that the interaction object corresponding to the predicted hot region is a target interaction object with which the user has interactive intention when the first motion feature of the visual indicator identifier matches with an intra-hot-region motion feature corresponding to the predicted hot region comprises: determining that the interaction object corresponding to the predicted hot region is a target interaction object with which the user has interactive intention when a speed curve of the visual indicator identifier conforms to a speed condition of a first-order feature region in the predicted hot region and the speed curve of the visual indicator identifier conforms to a speed condition of a second-order feature region in the predicted hot region; wherein the second-order feature region is located between the first-order feature region and the sensing region. The speed condition of the first-order feature region is as follows: the speed increases. The speed condition of the second-order feature region is as follows: the speed decreases. If the speed curve of the visual indicator identifier does not conform to the speed condition of the first-order feature region or the speed condition of the second-order feature region, the interaction object corresponding to the predicted hot region cannot be determined as the target interaction object.

Of course, in the embodiment, the speed condition and the acceleration condition are only given as examples here. The acceleration condition and the speed condition may be specifically set according to the operating habits of an user in the scene. In other embodiments, the acceleration condition of the first-order feature region is as follows: the acceleration is greater than or equal to 0 and gradually increases. The acceleration condition of the second-order feature region is as follows: the acceleration is equal to 0. The speed condition of the first-order feature region is as follows: the speed increases. The speed condition of the second-order feature region is as follows: the speed is constant. In addition, the number of the multi-order feature regions is not limited to two. In other embodiments, there may also be three or more multi-order feature regions. At this time, the speed curve or the acceleration curve of the visual indicator identifier should conform to the corresponding conditions of the multi-order feature region, respectively.

As shown in FIG. 3*a* and FIG. 3*b*, if the acceleration change at A1 in FIG. 3*a* conforms to the acceleration condition of the first-order feature region, and the acceleration change at A2 in FIG. 3*a* conforms to the acceleration condition of the second-order feature region, it is determined that the first motion feature of the visual indicator identifier matches with the intra-hot-region motion feature corresponding to the predicted hot region. If the first motion feature matches with the intra-hot-region motion feature, it is determined that the interaction object corresponding to the predicted hot region is the target interaction object with which the user has interactive intention.

It should be noted that, in a specific implementation, it may only be judged whether the speed curve of the visual indicator identifier conforms to the speed condition of the first-order feature region and the speed condition of the second-order feature region; alternatively, only it may only be judged whether the acceleration curve of the visual indicator identifier conforms to the acceleration condition of the first-order feature region and the acceleration condition of the second-order feature region; alternatively, the judgment may be made based on the speed curve and the acceleration curve of the visual indicator identifier, respectively, and only one of the speed curve and the acceleration curve of the visual indicator identifier meets the corresponding condition. In other examples, the judgment may also be made based on the speed curve and the acceleration curve of the visual indicator identifier, respectively, and if both the speed curve and the acceleration curve of the visual indicator identifier meet the corresponding conditions, it is determined that the interaction object corresponding to the predicted hot region is the target interaction object with which the user has interactive intention.

In other examples, the intra-hot-region motion feature of the predicted hot region of the interaction object may comprise a speed curve and/or an acceleration curve. The similarity between the speed curve of the visual indicator identifier and the preset speed curve may be determined, and/or the similarity between the acceleration curve of the visual indicator identifier and the preset acceleration curve may be determined. When the determined similarity reaches the preset similarity threshold, matching is determined between both. The similarity threshold may be determined according to actual needs. For example, the similarity threshold may be 80% or 85% or 90% or 95% or 99%, or a value between any two of the above.

The method for predicting user interactive intention provided by the embodiment comprises: acquiring position information of a visual indicator identifier, and the visual indicator identifier being configured to mark a manipulation position of a user in a preset space; determining a relative position relationship between the visual indicator identifier and a predicted hot region of an interaction object according to the position information of the visual indicator identifier; determining a first motion feature of the visual indicator identifier in the predicted hot region when it is determined that the visual indicator identifier is located in the predicted hot region according to the relative position relationship; and determining that the interaction object is a target interaction object with which the user has interactive intention when the first motion feature of the visual indicator identifier matches with an intra-hot-region motion feature corresponding to the predicted hot region. In this way, based on the real-time captured motion data of the visual indicator identifier corresponding to a gesture or an eye movement of an user or a controller and the like, the next operation intention of the user is predicted in combination with the motion feature of the predicted hot region of the interaction object, thus helping the user to conveniently and quickly perform the selecting operation, saving the time and energy of the user, reducing fatigue and dissatisfaction of the user, and further improving user interaction experience.

Figure 4:
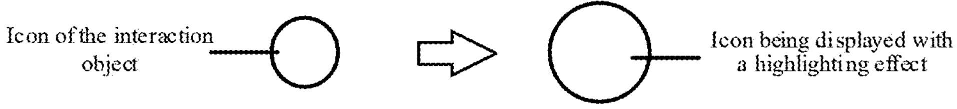
FIG. 4 is a schematic diagram when an interaction object is not highlighted or highlighted according to an embodiment of the present disclosure.

In some embodiments, in Step S104, after determining the target interaction object, the embodiment may comprise displaying the target interaction object with a highlighting effect. For example, the icon of the target interaction object is displayed in an enlarged manner, or is displayed in a luminous manner, or is displayed in a preset color, or is displayed with a size change of a preset frequency. As shown in FIG. 4, the left side of the figure is a schematic diagram when the icon of the interaction object is not highlighted, and the right side of the figure is a schematic diagram when the icon of the interaction object is displayed in an enlarged manner.

In the embodiment, the icon of the interaction object is highlighted by visual performance, so that users can perform the selection operations more easily.

In other embodiments, after determining the target interaction object, the embodiment may further comprise: adsorbing the visual indicator identifier into the sensing region of the target interaction object. Within a preset time, in response to an instruction that the user moves the visual indicator identifier to the sensing region away from the target interaction object, it is confirmed that the user has not selected the target interaction object. If the picture of the target interaction object has a highlighting effect, the highlighting effect is ended.

In some embodiment, the predicted hot region comprises a first sub-region located at a periphery of a sensing region. Alternatively, the first sub-region is annular. For example, the sensing region of the interaction object may be circular, and the first sub-region may also be circle annular. Alternatively, the sensing region of the interaction object may be fan-shaped, and the first sub-region may also be semicircular.

The specific shape and size of the first sub-region may be set according to actual needs. When the first sub-region is large, it is easier to predict the user interactive intention. When the first sub-region is small, the user interactive intention is predicted more accurately. In a specific implementation, the size of the first sub-region may be set reasonably according to the requirements of the application scene.

In some examples, the predicted hot region further comprises a second sub-region connected to the first sub-region and located at an outer side of the first sub-region. The specific position and range of the second sub-region may be set according to the needs of the scene. It may be understood that the specific position and range of the second sub-region may be the same or different in different scenes.

Figure 5A:
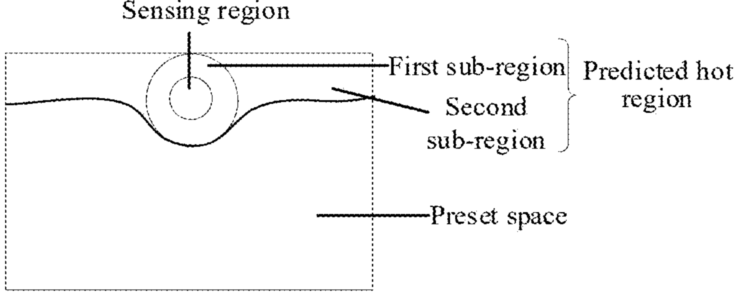
FIG. 5*a*, FIG. 5*b* and FIG. 5*c* are schematic diagrams of the positions of a sensing region and a predicted hot region of an interaction object according to an embodiment of the present disclosure.
Figure 5B:
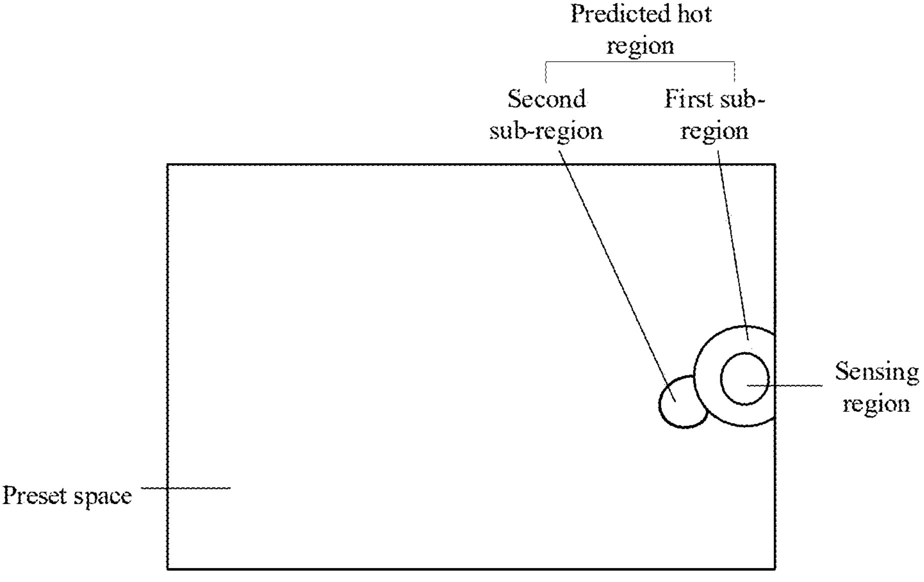
Figure 5C:
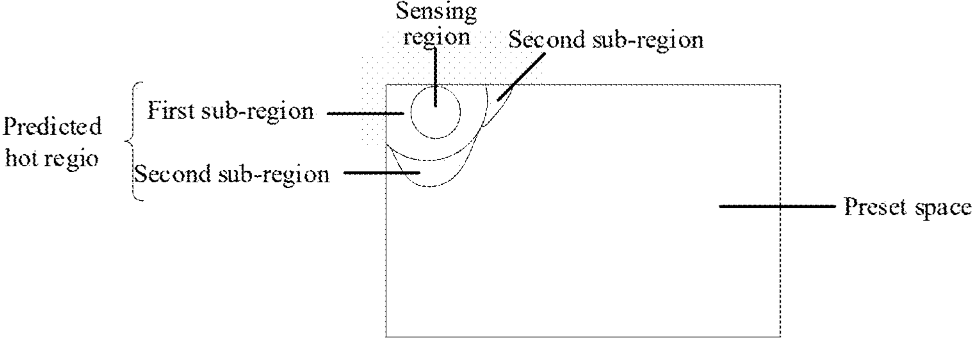

Alternatively, the second sub-region extends along at least one direction and in a direction away from the sensing region of the interaction object. With reference to FIG. 5*a*, FIG. 5*b* and FIG. 5*c*, the second sub-region extends toward at least one edge of the preset space; alternatively, the second sub-region extends in a direction toward the center of the preset space. When the second sub-region extends toward the edge of the preset space, the second sub-region may extend toward two opposite edges of the preset space; alternatively, the second sub-region extends toward two adjacent edges of the preset space. Of course, the second sub-region may also extend toward one edge of the preset space.

For example, when the interaction object is close to the edge of the preset space, that is, when the distance between the center of the interaction object and the edge of the preset space is less than or equal to a third distance threshold, the predicted hot region may comprise a first sub-region and a second sub-region. The second sub-region may extend along at least one edge of the preset space, such as two opposite edges of the preset space. Alternatively, the second sub-region may also extend along the direction of the center of the preset space.

For example, the preset space may have a first edge, a second edge, a third edge and a fourth edge. The interaction object is disposed near the first edge. The second edge and the third edge are oppositely disposed. The second edge and the third edge are adjacent to the first edge, respectively. The fourth edge and the first edge are oppositely provided. The second sub-region may extend toward any one of the first edge, the second edge, the third edge and the fourth edge. The second sub-region may also extend toward any two or three of the first edge, the second edge, the third edge and the fourth edge.

When the second sub-region extends toward the first edge, the second sub-region may extend until the outer edge of the second sub-region are at least partially overlapped with the first edge. When the second sub-region extends toward other edges of the preset space, the second sub-region may extend until the outer edge of the second sub-region are at least partially overlapped with other edges of the preset space. Alternatively, the second sub-region may extend until there is a preset distance between the outer edge of the second sub-region and other edges of the preset space.

As shown in FIG. 5*a* to FIG. 5*c*, when the preset space is a rectangular region, four edges of the rectangular region are referred to as a first edge, a second edge, a third edge and a fourth edge, respectively. The second edge and the third edge are oppositely disposed, the fourth edge and the first edge are oppositely disposed. As shown in FIG. 5*a*, when the interaction object is provided near the first edge, the second sub-region may extend along the second edge and the third edge. As shown in FIG. 5*b*, when the interaction object is provided near the second edge, the second sub-region may extend in the direction toward the third edge. As shown in FIG. 5*c*, when the interaction object is provided near the first edge and the third edge, the second sub-region may extend along the second edge and the fourth edge, respectively.

It can be understood that the second sub-region is not limited to this when being provided, and this embodiment is only illustrated as an example here. When the interaction object is provided near the center of the preset space, that is, when the distance between the center of the interaction object and the edge of the preset space is greater than the third distance threshold, the predicted hot region may only comprise the first sub-region. Alternatively, the predicted hot region may comprise the first sub-region and the second sub-region, and the second sub-region may be provided in a manner similar to the above example.

In the present embodiment, the predicted hot region is provided reasonably, which further predicts the user interactive intention in advance easily, thus helping the user to conveniently and quickly perform the selection operations, and improving user interaction experience.

Figure 6:
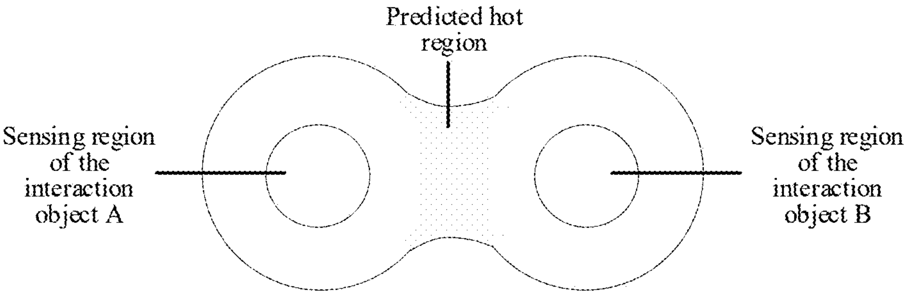
FIG. 6 is a schematic diagram of a scene in which predicted hot regions of two interaction objects are connected and are partially overlapped with each other according to an embodiment of the present disclosure.

In some embodiments, as shown in FIG. 6, when the distance between two interaction objects is small, that is, when the distance between the outer edges of the sensing regions of the two interaction objects is less than or equal to the second threshold, the predicted hot regions of the two interaction objects are connected and are partially overlapped with each other, that is, there is an overlapping region between the predicted hot regions of the two interaction objects. The shape and the size of the overlapping region may be set according to actual needs.

It can be understood that when the distance between two interaction objects is large, the predicted hot regions of the two interaction objects are not overlapped with each other, that is, there is no overlapping region between the predicted hot regions of the two interaction objects.

In some example, in step S103, the determining a first motion feature of the visual indicator identifier in the predicted hot region, when it is determined that the visual indicator identifier is located in the predicted hot region according to the relative position relationship may comprises the following a1:

Step a1, determining scores of the visual indicator identifier corresponding to the predicted hot regions of the two interaction objects, respectively, when the visual indicator identifier is located in an overlapping region of predicted hot regions of the two interaction objects.

For example, determining scores of the visual indicator identifier corresponding to the predicted hot regions of the two interaction objects may comprises: determining a distance between the visual indicator identifier and the sensing regions of the predicted hot regions of the two interaction objects, respectively, herein, the first motion feature is a distance between the visual indicator identifier and the sensing region of the predicted hot region.

In some examples, in step S104, the determining the interaction object corresponding to the predicted hot region as a target interaction object with which the user has interactive intention, when the first motion feature of the visual indicator identifier matches with an intra-hot-region motion feature corresponding to the predicted hot region may comprises the following Step a2:

Step a2, taking the interaction object corresponding to the highest score as the target interaction object with which the user has interactive intention.

In Step a1, different scores may be set for different portions of the predicted hot region in advance. The score is negatively correlated with a first interval, which is a distance between the visual indicator identifier and the sensing region. As an example, the predicted hot region is circle annular, and the predicted hot region may be divided into a plurality of concentric rings. The closer the ring is to the sensing region, the higher the score.

Figure 7A:
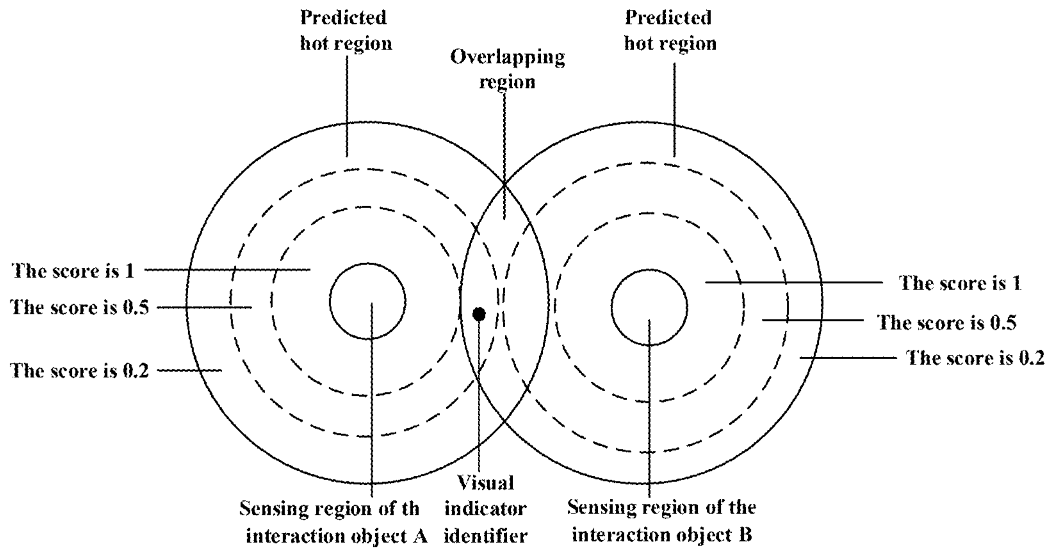
FIG. 7*a* and FIG. 7*b* are schematic diagrams of the score distribution of each part of a predicted hot region of an interaction object according to an embodiment of the present disclosure.

As shown in FIG. 7*a*, the interaction region in the graphical user interface of the terminal is taken as an example of the preset space. The predicted hot region of the interaction object A may be divided into three concentric rings. The scores of the three concentric rings are 1, 0.5 and 0.2, respectively, in the direction away from the sensing region of the interaction object A. The predicted hot region of the interaction object B may be divided into three concentric rings. The scores of the three concentric rings are 1, 0.5 and 0.2, respectively, in the direction away from the sensing region of the interaction object B. By taking the visual indicator identifier being located at a position shown in FIG. 7*a*, the score of the visual indicator identifier in the predicted hot region of the interaction object A is 0.5, and the score of the visual indicator identifier in the predicted hot region of the interaction object B is 0.2. The score of the visual indicator identifier in the predicted hot region of the interaction object A is greater than the score of the visual indicator identifier in the predicted hot region of the interaction object B, and then the interaction object A is determined as the target interaction object.

In addition, if the scores of the visual indicator identifier in the predicted hot regions of the two interaction objects are equal to each other, both interaction objects may be determined as the target interaction objects, and the icons of the two target interaction objects may be displayed with a highlighting effect, respectively.

In other examples, if the number of times or frequency that the user selects one of the interaction objects is higher than that of the other interaction object according to the historical data, the score of the interaction object that the user selects with the high number of times or frequency may be set to be large. For example, if the number of times or frequency that the user selects the interaction object A is higher than that of the interaction object B, the scores of the three concentric rings of the interaction object A are 1, 0.8 and 0.5, respectively, in the direction away from the sensing region of the interaction object A. The scores of the three concentric rings of the interaction object B are 1, 0.5 and 0.2, respectively, in the direction away from the sensing region of the interaction object B.

Figure 7B:
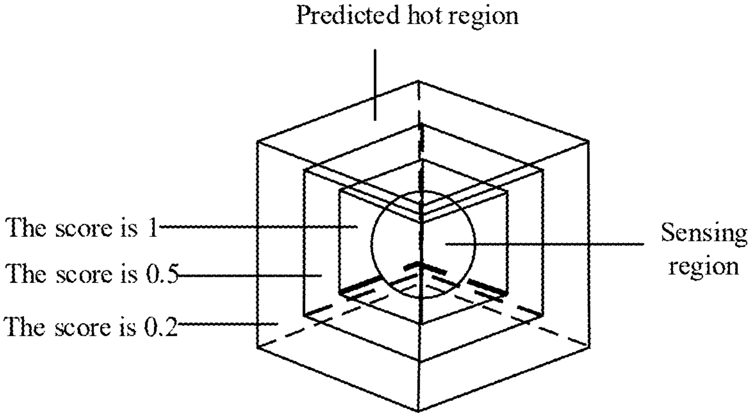

As shown in FIG. 7*b*, when the preset space is an interaction space in the three-dimensional space, the scores of different regions of the predicted hot region may be set similarly to the above example. This embodiment will not be described in detail here.

In other examples, if the scores of the visual indicator identifiers in the predicted hot regions of the two interaction objects are equal to each other, the distances between the visual indicator identifier and the sensing regions of the two interaction objects may be further determined, and the interaction object with a smaller distance may be taken as the target interaction object. Taking the interaction object A and the interaction object B as examples, it is determined that the interaction object A is the target interaction object if the score of the visual indicator identifier in the predicted hot region of the interaction object A and the score of the visual indicator identifier in the predicted hot region of the interaction object B are equal to each other and the distance between the visual indicator identifier and the outer edge of the sensing region of the interaction object A is greater than the distance between the visual indicator identifier and the outer edge of the sensing region of the interaction object B.

Alternatively, if the scores of the visual indicator identifier in the predicted hot regions of the two interaction objects are equal to each other, the number of times that the user selects the two interaction objects, respectively, within a preset historical period may be further determined, and the interaction object that the user selects with the high number of times is taken as the target interaction object. Taking the interaction object A and the interaction object B as examples, the interaction object A is determined as the target interaction object if the score of the visual indicator identifier in the predicted hot region of the interaction object A and the score of the visual indicator identifier in the predicted hot region of the interaction object B are equal to each other and the number of times that the user selects the interaction object A within a preset historical period is greater than the number of times the user selects the interaction object B.

In some embodiments, the method of the present embodiment further comprises: determining the hot region feature corresponding to the control mode selected by the user in response to a selection operation of the control mode;

wherein the control mode comprises a gesture control mode, an eye movement control mode, and an interactor control mode. It can be understood that the control mode may further comprise other modes when the user controls the visual indicator identifier through other modes or a device.

The hot region feature comprises: the shape of the outer edge of the predicted hot region, the distance between the outer edge of the predicted hot region and the outer edge of the sensing region, and the intra-hot-region motion feature corresponding to the predicted hot region. The magnitude of the distance between the outer edge of the predicted hot region and the outer edge of the sensing region is used to reflect the magnitude of the range of the predicted hot region.

Figure 8A:
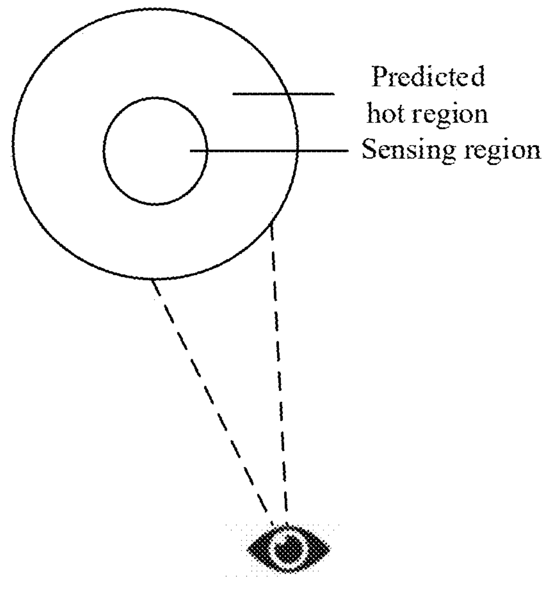
FIG. 8*a* is a schematic diagram of a predicted hot region of an interaction object in an eye movement control mode according to an embodiment of the present disclosure.
Figure 8B:
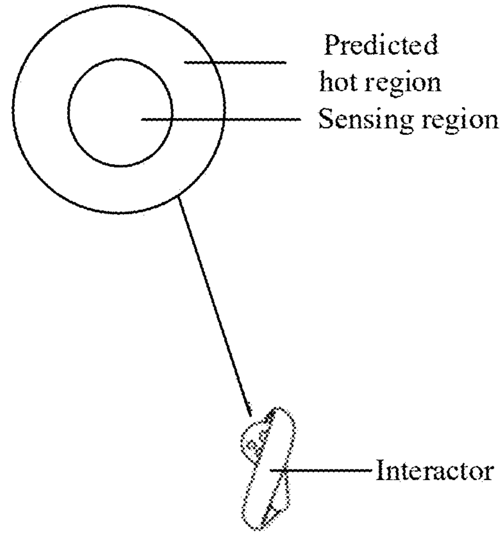
FIG. 8*b* is a schematic diagram of a predicted hot region of an interaction object in an interactor control mode according to an embodiment of the present disclosure.

In a specific implementation, the predicted hot region of the interaction object in different control modes may be provided reasonably according to the size of the visual indicator identifier, the control accuracy and the user behavior habit under different control modes, so as to further improve the user experience. For example, FIG. 8*a* is a schematic diagram illustrating the range of a predicted hot region of an interaction object in an eye movement control mode. FIG. 8*b* is a schematic diagram illustrating the range of a predicted hot region of an interaction component in an interactor control mode. As shown in FIG. 8*a* and FIG. 8*b*, when the current control mode is the eye movement control mode, the range of the predicted hot region of the interaction object is greater than the range of the predicted hot region of the interaction object in other control modes, such as the interactor control mode. Moreover, the intra-hot-region motion feature is also obtained based on the historical data in the eye movement control mode.

After a certain period of time, when the eye movement control mode is switched to the gesture control mode in response to an instruction of an user, the hot region feature of the predicted hot region of the interaction object in the eye movement control mode is switched to the hot region feature of the predicted hot region of the interaction object in the gesture control mode.

In the embodiment, since the size of the visual indicator identifier, the control accuracy and the behavior habit of the user are different under different control modes, the hot region feature of the predicted hot region of the interaction object may be changed with the switching of the control modes, to adapt to the differences in the size of the visual indicator identifier, the control accuracy and the behavior habit of the user under different control modes, which is not only conducive to help the user to conveniently and quickly perform the selection operation, but also gives consideration to the higher accuracy of the prediction result.

Figure 9A:
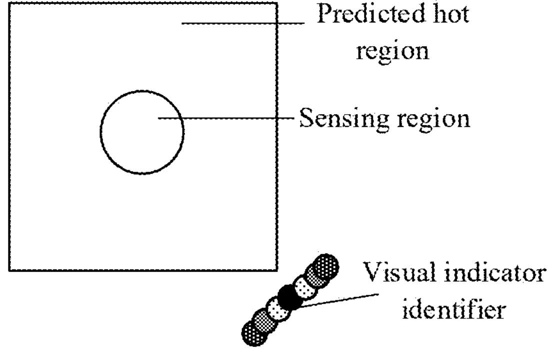
FIG. 9*a* and FIG. 9*b* are schematic diagrams of the movement of a visual indicator identifier at an edge of a predicted hot region of an interaction object according to an embodiment of the present disclosure.
Figure 9B:
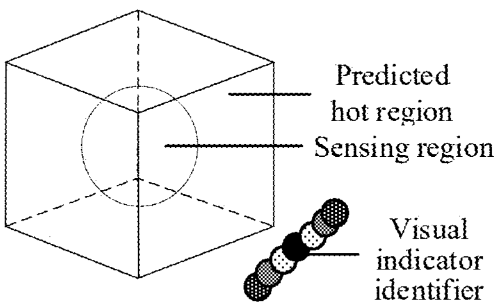

In some embodiments, the interaction object is also determined as the target interaction object when the visual indicator identifier moves or shakes or wobbles frequently in the region near the outer edge of the predicted hot region of the interaction object. FIG. 9*a* and FIG. 9*b* are schematic diagrams illustrating that the visual indicator identifier moves frequently at the edge of the predicted hot region of the interaction object. FIG. 9*a* corresponds to a two-dimensional space scene, and FIG. 9*b* corresponds to a three-dimensional space scene. The visual indicator identifiers with different filling patterns in FIG. 9*a* and FIG. 9*b* are used to illustrate the positions of the visual indicator identifiers at different times.

The present embodiment may specifically comprise the following Step b1 to Step b2:

Step b1, determining a second motion feature of the visual indicator identifier when it is determined that a distance between the visual indicator identifier and an edge of the predicted hot region is less than or equal to a second distance threshold according to the relative position relationship; and Step b2: determining that the interaction object corresponding to the predicted hot region is a target interaction object with which the user has interactive intention when the second motion feature of the visual indicator identifier matches with a motion feature of a hot region edge of the predicted hot region.

In Step b1, the second motion feature of the visual indicator identifier may comprise a speed curve of the visual indicator identifier, and/or an acceleration curve of the visual indicator identifier, and/or an offset direction of the visual indicator identifier, and/or an offset amount of the visual indicator identifier, and/or a moving path of the visual indicator identifier.

In Step b2, in some examples, the motion feature of the hot region edge of the predicted hot region of the interaction object may be determined according to the historical data. The motion feature of the hot region edge may comprise a speed condition or an acceleration condition or an offset condition or a moving path or a fixed integral condition. In a specific implementation, when it is determined that the second motion feature of the visual indicator identifier conforms to the speed condition, the acceleration condition, the offset condition, the moving path or the fixed integral condition, the interaction object corresponding to the predicted hot region is determined as the target interaction object.

In other examples, the motion feature of the hot region edge may comprise a speed curve, an acceleration curve, an offset curve or a moving trajectory, etc. Accordingly, the similarity between the curve in the second motion feature of the visual indicator identifier and the corresponding curve in the motion feature of the hot region edge may be determined. When the similarity therebetween reaches the preset similarity threshold, it is determined that the curve matches with the corresponding curve. The similarity threshold may be determined according to actual needs. For example, the similarity threshold may be 80% or 85% or 90% or 95% or 99%, or a value between any two of the above.

Through the above settings, the present embodiment can be applied to more interaction scenes, which is further conducive to help a user conveniently and quickly perform the selection operation.

Figures 10, 11:
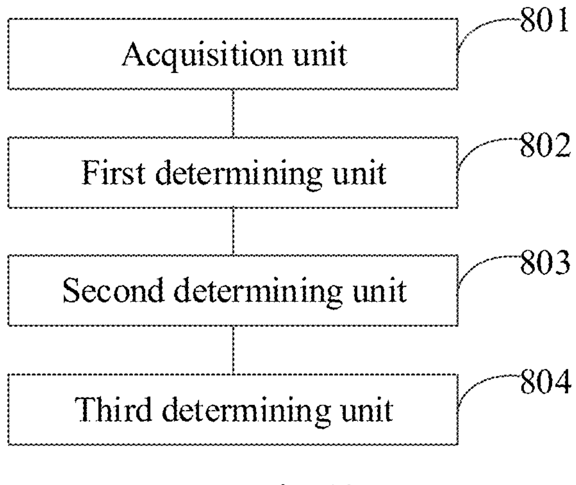
FIG. 10 is a schematic structural diagram of a device of predicting user interactive intention according to an embodiment of the present disclosure.
FIG. 11 is a schematic structural diagram of an apparatus for predicting user interactive intention according to another embodiment of the present disclosure.

In order to better implement the method for predicting user interactive intention according to the embodiment of the present disclosure, the embodiment of the present disclosure further provides a device of predicting the user interactive intention. FIG. 10 is a schematic structural diagram of a device of predicting user interactive intention according to an embodiment of the present disclosure. With reference to FIG. 10, the device comprises the following units:

an acquisition unit 801, which is configured to acquire position information of a visual indicator identifier; wherein the visual indicator identifier is configured to mark a manipulation position of a user in a preset space;

a first determining unit 802, which is configured to determine a relative position relationship between the visual indicator identifier and a predicted hot region of an interaction object according to the position information of the visual indicator identifier;

a second determining unit 803, which is configured to determine a first motion feature of the visual indicator identifier in the predicted hot region when it is determined that the visual indicator identifier is located in the predicted hot region according to the relative position relationship; and a third determining unit 804, which is configured to determine that the interaction object is a target interaction object with which the user has interactive intention when the first motion feature of the visual indicator identifier matches with an intra-hot-region motion feature corresponding to the predicted hot region.

In some embodiment, the predicted hot region comprises a first sub-region located at a periphery of a sensing region.

In some embodiments, the predicted hot region further comprises a second sub-region connected to an outer side of the first sub-region.

In some embodiments, the second sub-region extends in a direction away from the sensing region of the interaction object.

In some embodiments, the second sub-region extends toward at least one edge of the preset space.

In some embodiments, the second sub-region extends in a direction toward the center of the preset space.

In some embodiments, the second sub-region extends toward two opposite edges of the preset space.

In some embodiments, the second sub-region extends toward two adjacent edges of the preset space.

In some embodiments, when a distance between sensing regions of two interaction objects is less than or equal to a first distance threshold, the predicted hot regions of the two interaction objects are partially overlapped with each other.

In some embodiments, the third determining unit is further configured to:

determine scores of the visual indicator identifier corresponding to the predicted hot regions of the two interaction objects, respectively, when the visual indicator identifier is located in an overlapping region of two predicted hot regions;

take the interaction object corresponding to the highest score as the target interaction object with which the user has interactive intention.

In some embodiments, the score is negatively correlated with the first spacing, which is the distance between the visual indicator identifier and the sensing region.

In some embodiments, the third determining unit is specifically configured to:

determine that the interaction object corresponding to the predicted hot region is a target interaction object with which the user has interactive intention when a speed curve of the visual indicator identifier conforms to a speed condition of a first-order feature region in the predicted hot region and the speed curve of the visual indicator identifier conforms to a speed condition of a second-order feature region in the predicted hot region, wherein the second-order feature region is located between the first-order feature region and the sensing region of the interaction object.

In some embodiments, the speed condition of the first-order feature region comprises: the speed increases. The speed condition of the second-order feature region comprises: the speed decreases.

In some embodiments, the third determining unit is specifically configured to:

determine that the interaction object corresponding to the predicted hot region is a target interaction object with which the user has interactive intention when an acceleration curve of the visual indicator identifier conforms to an acceleration condition of the first-order feature region in the predicted hot region and the acceleration curve of the visual indicator identifier conforms to an acceleration condition of the second-order feature region in the predicted hot region, wherein the second-order feature region is located between the first-order feature region and the sensing region of the interaction object.

In some embodiments, the acceleration condition of the first-order feature region comprises: the acceleration is greater than or equal to 0 and gradually increases. The acceleration condition of the second-order feature region comprises: the acceleration decreases and the acceleration is less than or equal to 0.

In some embodiments, the device further comprises a display unit, which is configured to:

display the target interaction object with a highlighting effect.

In some embodiments, the device further comprises a fourth determining unit, which is configured to:

determine the range of the predicted hot region corresponding to a control mode selected by the user and the intra-hot-region motion feature corresponding to the predicted hot region in response to a selection operation of the control mode, wherein the control mode comprises a gesture control mode, an eye movement control mode, and an interactor control mode.

In some embodiments, the device further comprises a fifth determining unit, which is configured to:

determine a second motion feature of the visual indicator identifier when it is determined that a distance between the visual indicator identifier and an edge of the predicted hot region is less than or equal to a second distance threshold according to the relative position relationship; and determine that the interaction object is a target interaction object with which the user has interactive intention when the second motion feature of the visual indicator identifier matches with a motion feature of a hot region edge of the predicted hot region.

Various units in the above device of predicting user interactive intention may be implemented in whole or in part by software, hardware and the combination thereof. The various units may be embedded in or independent of the processor in the electronic apparatus in the form of hardware, and may also be stored in the memory of the electronic apparatus in the form of software, so that the processor can call and execute the operations corresponding to the various units.

The device of predicting user interactive intention may be integrated in a terminal or server with a memory and a processor which has computing power, or the device of predicting user interactive intention is a terminal or a server.

In some embodiments, the present disclosure further provides an apparatus for predicting user interactive intention, which comprises a memory and a processor, wherein the memory is used for storing executable instructions of the processor, and the processor is configured to execute the steps in the above method embodiments by executing the executable instructions.

In some embodiments, FIG. 11 is a schematic structural diagram of an apparatus for predicting user interactive intention according to an embodiment of the present disclosure. As shown in FIG. 11, the apparatus for predicting user interactive intention comprises a processor 903 with one or more processing cores, a memory 902 with one or more computer-readable storage media, and a computer program stored in the memory 902 and operable in the processor 903. The processor 903 and the memory 902 are connected through a communication bus 901. It can be understood by those skilled in the art that the computer apparatus structure shown in the figure does not constitute a limitation on the computer apparatus, and may comprise more or less components than those shown in the figure, or combine some components, or have different component arrangements.

The processor 903 is the control center of the apparatus for predicting user interactive intention which connects all parts of the whole electronic apparatus using various interfaces and lines, and performs various functions and processes data of the electronic apparatus by operating or loading software programs and/or modules stored in the memory 902 and calling data stored in the memory 902, thus monitoring the electronic apparatus as a whole.

In the embodiment of the present disclosure, the processor 903 in the electronic apparatus implements the steps in the above method embodiments, and load the instructions corresponding to the processes of one or more application programs into the memory 902. Moreover, the processor 903 operate the application programs stored in the memory 902, thus implementing various functions.

It can be understood by those skilled in the art that the electronic apparatus structure shown in FIG. 11 does not constitute a limitation on the electronic apparatus, and may comprise more or less components than shown in the figure, or combine some components, or have different component arrangements.

Although not shown in FIG. 11, the apparatus for predicting user interactive intention may further comprise a radio frequency circuit, an audio circuit, a power camera, a wireless fidelity module, a Bluetooth module, an input module, etc., which will not be described in detail here. The radio frequency circuit may be used to transmit and receive RF signals, so as to establish wireless communication with the network apparatus or other electronic apparatuses through wireless communication, and transmit and receive signals with the network apparatus or other electronic apparatuses. The audio circuit may be used to provide an audio interface between a user and the electronic apparatus through a speaker and a microphone. The audio circuit may transmit the electrical signal converted from the received audio data to the speaker, and the speaker converts the electrical signal into a sound signal for output. On the other hand, the microphone converts the collected sound signal into an electrical signal, which is converted into audio data after being received by the audio circuit. The audio data is then output to the processor 903 for processing, and then is sent to another electronic apparatus through the radio frequency circuit, or the audio data is output to the memory for further processing. The audio circuit may further comprise an earphone jack to provide communication between the peripheral earphone and the electronic apparatus. The power supply is used to supply power to various components of the electronic apparatus.

In some embodiments, the present disclosure further provides a computer-readable storage medium, and the computer-readable storage medium stores a computer program. The computer-readable storage medium may be applied to the electronic apparatus. The computer program enables the electronic apparatus to execute the corresponding flow in the method for predicting user interactive intention according to an embodiment of the present disclosure, which is not described in detail here for brevity.

In some embodiments, the present disclosure further provides a computer program product, which comprises a computer program stored in a computer-readable storage medium. The processor of the electronic apparatus reads the computer program from the computer-readable storage medium. The processor executes the computer program, so that the electronic apparatus executes the corresponding flow in the method for predicting user interactive intention according to an embodiment of the present disclosure, which is not described in detail here for brevity.

It should be understood that the processor of the embodiment of the present disclosure may be an integrated circuit chip with signal processing capability. In the implementation process, each step of the above method embodiment may be completed by hardware integrated logic circuits or software instructions in the processor. The processor may be a general processor, a Digital Signal Processor (DSP), an application specific integrated circuit (ASIC), a Field Programmable Gate Array (FPGA) or other programmable logic devices, discrete gate or transistor logic devices, and discrete hardware interactive objects. The methods, steps and logic blocks disclosed in the embodiments of the present disclosure may be realized or executed. The general processor may be a microprocessor or the processor may be any conventional processor, etc. The steps of the method disclosed in the embodiment of the present disclosure may be directly embodied as the execution completion by a hardware decoding processor, or the execution completion by a combination of hardware and software modules in the decoding processor. Software module may be located in random access memory, flash memory, read-only memory, programmable read-only memory or electrically erasable programmable memory, registers and other mature storage media in the field. The storage medium is located in the memory, and the processor reads the information in the memory and combines its hardware to complete the steps of the above method.

It may be understood that the memory in the embodiment of the present disclosure may be a volatile memory or a nonvolatile memory, or may include both volatile and nonvolatile memories. Among them, the nonvolatile memory may be Read-Only Memory (ROM), programmable read-only memory (PROM), erasable programmable read-only memory (EPROM), electrically erasable programmable read-only memory (EEPROM) or flash memory. The volatile memory may be a Random Access Memory (RAM), which is used as an external cache. By way of illustration, but not limitation, many forms of RAM are available, such as static random access memory (SRAM), dynamic random access memory (DRAM), synchronous dynamic random access memory (Synchronous DRAM, SDRAM), Double Data Rate synchronous dynamic random access memory (Double Data Rate SDRAM, DDR SDRAM), enhanced synchronous dynamic random access memory (Enhanced SDRAM, ESDRAM), synchronous link dynamic random access memory (synch link DRAM, SLDRAM) and direct memory bus random access memory (Direct Rambus RAM, DR RAM). It should be noted that the memories of the systems and methods described herein are intended to include, but are not limited to, these and any other suitable types of memories.

It can be realized for those skilled in the art that the units and algorithm steps of various examples described in connection with the embodiments disclosed herein may be implemented in electronic hardware, or a combination of computer software and electronic hardware. Whether these functions are implemented in a form of hardware or software depends on the specific application and design constraints of the technical solution. Skilled people may use different methods to realize the described functions for each specific application, but this implementation should not be considered beyond the scope of the present disclosure.

It can be clearly understood by those skilled in the art that for the convenience and conciseness of description, the specific working processes of the systems, devices and units described above may refer to the corresponding processes in the aforementioned method embodiments, and will not be repeated here.

In several embodiments provided by the present disclosure, it should be understood that the disclosed systems, devices and methods may be realized in other ways. For example, the device embodiment described above is only schematic. For example, the division of the units is only a logical function division. In actual implementation, there may be another division method, for example, multiple units or interactive objects may be combined or integrated into another system, or some features may be omitted or not executed. On the other hand, the mutual coupling or direct coupling or communication connection shown or discussed may be indirect coupling or communication connection through some interfaces, devices or units, which may be electrical, mechanical or other forms.

The units described as separate components may or may not be physically separated, and the components displayed as units may or may not be physical units, that is, they may be located in one place or distributed to multiple network units. Some or all of the units may be selected according to actual needs to achieve the purpose of the present embodiment.

In addition, each functional unit in the embodiment of the present disclosure may be integrated into one processing unit, or each unit may exist separately and physically, or two or more units may be integrated into one unit.

If the functions are realized in the form of software functional units and sold or used as independent products, they may be stored in a computer-readable storage medium. Based on the understanding, the technical solution of the present disclosure or a portion which contributes to the prior art or the portion of the technical solution naturally may be embodied in the form of a software product, which is stored in a storage medium and includes a plurality of instructions to make an electronic device (which may be a personal computer or a server) execute all or a portion of the steps of the method described in various embodiments of the present disclosure. The aforementioned storage medium includes: U disk, mobile hard disk, ROM, RAM, magnetic disk or optical disk and other media that can store program codes.

What are described above is related to the specific embodiments of the present disclosure only and not limitative to the protection scope of the present disclosure. Any modification and equivalent replacement which is easily thought out by those skilled in the art within the technical scope disclosed in the present disclosure should be included in the protection scope of the present disclosure. Therefore, the protection scope of the disclosure shall be based on the protection scope of the claims.

The invention claimed is:

1. A method for predicting user interactive intention, comprising:

acquiring position information of a visual indicator identifier, the visual indicator identifier being configured to mark a manipulation position of a user in a preset space;

determining a relative position relationship between the visual indicator identifier and a predicted hot region of an interaction object according to the position information of the visual indicator identifier;

determining a first motion feature of the visual indicator identifier in the predicted hot region, when it is determined that the visual indicator identifier is located in the predicted hot region according to the relative position relationship; and determining the interaction object corresponding to the predicted hot region as a target interaction object with which the user has interactive intention, when the first motion feature of the visual indicator identifier matches with an intra-hot-region motion feature corresponding to the predicted hot region.

2. The method according to claim 1, wherein the predicted hot region comprises a first sub-region, and the first sub-region is located at a periphery of a sensing region of the interaction object.

3. The method according to claim 2, wherein the predicted hot region further comprises a second sub-region, and the second sub-region is connected to an outer side of the first sub-region.

4. The method according to claim 3, wherein the second sub-region extends along a direction away from the sensing region of the interaction object.

5. The method according to claim 4, wherein the second sub-region extends toward at least one edge of the preset space; or, the second sub-region extends in a direction toward a center of the preset space.

6. The method according to claim 4, wherein the second sub-region extends toward two opposite edges of the preset space.

7. The method according to claim 1, wherein when a distance between sensing regions of two interaction objects is less than or equal to a first distance threshold, predicted hot regions of the two interaction objects are partially overlapped with each other.

8. The method according to claim 7, wherein the determining a first motion feature of the visual indicator identifier in the predicted hot region, when it is determined that the visual indicator identifier is located in the predicted hot region according to the relative position relationship comprises:

determining scores of the visual indicator identifier corresponding to the predicted hot regions of the two interaction objects, respectively, when the visual indicator identifier is located in an overlapping region of predicted hot regions of the two interaction objects.

9. The method according to claim 8, wherein the determining the interaction object corresponding to the predicted hot region as a target interaction object with which the user has interactive intention, when the first motion feature of the visual indicator identifier matches with an intra-hot-region motion feature corresponding to the predicted hot region comprises:

taking the interaction object corresponding to a highest score as the target interaction object with which the user has interactive intention.

10. The method according to claim 1, wherein the determining the interaction object corresponding to the predicted hot region as a target interaction object with which the user has interactive intention, when the first motion feature of the visual indicator identifier matches with the intra-hot-region motion feature corresponding to the predicted hot region, comprises:

determining the interaction object corresponding to the predicted hot region as the target interaction object with which the user has interactive intention, when a speed curve of the visual indicator identifier conforms to a speed condition of a first-order feature region in the predicted hot region and the speed curve of the visual indicator identifier conforms to a speed condition of a second-order feature region in the predicted hot region, wherein the second-order feature region is located between the first-order feature region and the sensing region of the interaction object.

11. The method according to claim 1, wherein the determining the interaction object corresponding to the predicted hot region as a target interaction object with which the user has interactive intention, when the first motion feature of the visual indicator identifier matches with the intra-hot-region motion feature corresponding to the predicted hot region, comprises:

determining the interaction object corresponding to the predicted hot region as the target interaction object with which the user has interactive intention when an acceleration curve of the visual indicator identifier conforms to an acceleration condition of the first-order feature region in the predicted hot region and the acceleration curve of the visual indicator identifier conforms to an acceleration condition of the second-order feature region in the predicted hot region, wherein the second-order feature region is located between the first-order feature region and the sensing region of the interaction object.

12. The method according to claim 1, wherein after determining the target interaction object, the method further comprises:

displaying the target interaction object with a highlighting effect.

13. The method according to claim 1, further comprising:

determining a range of the predicted hot region corresponding to a control mode selected by the user and the intra-hot-region motion feature corresponding to the predicted hot region, in response to a selection operation of the control mode, wherein the control mode comprises a gesture control mode, an eye movement control mode, and an interactor control mode.

14. The method according to claim 1, further comprising:

determining a second motion feature of the visual indicator identifier, when it is determined that a distance between the visual indicator identifier and an edge of the predicted hot region is less than or equal to a second distance threshold according to the relative position relationship; and determining the interaction object corresponding to the predicted hot region as the target interaction object with which the user has interactive intention, when the second motion feature of the visual indicator identifier matches with the intra-hot-region motion feature of the predicted hot region.

15. An apparatus for predicting user interactive intention, comprising:

at least one processor; and a non-transitory memory with instructions thereon, wherein the instructions upon execution by the at least one processor, cause the at least one processor to perform a method for predicting user interactive intention, and the method for predicting user interactive intention comprises:

acquiring position information of a visual indicator identifier, the visual indicator identifier being configured to mark a manipulation position of a user in a preset space;

determining a relative position relationship between the visual indicator identifier and a predicted hot region of an interaction object according to the position information of the visual indicator identifier;

determining a first motion feature of the visual indicator identifier in the predicted hot region, when it is determined that the visual indicator identifier is located in the predicted hot region according to the relative position relationship; and determining the interaction object corresponding to the predicted hot region as a target interaction object with which the user has interactive intention, when the first motion feature of the visual indicator identifier matches with an intra-hot-region motion feature corresponding to the predicted hot region.

16. The apparatus according to claim 15, wherein the predicted hot region comprises a first sub-region, and the first sub-region is located at a periphery of a sensing region of the interaction object.

17. The apparatus according to claim 16, wherein the predicted hot region further comprises a second sub-region, and the second sub-region is connected to an outer side of the first sub-region.

18. The apparatus according to claim 17, wherein the second sub-region extends along a direction away from the sensing region of the interaction object.

19. The apparatus according to claim 18, wherein the second sub-region extends toward at least one edge of the preset space; or, the second sub-region extends in a direction toward a center of the preset space.

20. A non-transitory computer-readable storage medium, wherein the computer-readable storage medium stores a computer program that cause at least one processor to perform a method for predicting user interactive intention, and the method for predicting user interactive intention comprises:

acquiring position information of a visual indicator identifier, the visual indicator identifier being configured to mark a manipulation position of a user in a preset space;

determining a relative position relationship between the visual indicator identifier and a predicted hot region of an interaction object according to the position information of the visual indicator identifier;

determining a first motion feature of the visual indicator identifier in the predicted hot region, when it is determined that the visual indicator identifier is located in the predicted hot region according to the relative position relationship; and determining the interaction object corresponding to the predicted hot region as a target interaction object with which the user has interactive intention, when the first motion feature of the visual indicator identifier matches with an intra-hot-region motion feature corresponding to the predicted hot region.

* * * * *